United States Patent
Bonanno et al.

(10) Patent No.: US 11,182,165 B2
(45) Date of Patent: Nov. 23, 2021

(54) SKIP-OVER OFFSET BRANCH PREDICTION

(71) Applicant: International Business Machines Corporation, Armonk, NY (US)

(72) Inventors: James Bonanno, Wappingers Falls, NY (US); Daniel Lipetz, Linden, NJ (US); Brian Robert Prasky, Campbell Hall, NY (US); Anthony Saporito, Highland, NY (US); Adam Collura, Hopewell Junction, NY (US); Steven J. Hnatko, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

(21) Appl. No.: 16/194,452

(22) Filed: Nov. 19, 2018

(65) Prior Publication Data
US 2020/0159537 A1    May 21, 2020

(51) Int. Cl.
*G06F 9/38* (2018.01)
*G06F 9/355* (2018.01)
*G06F 9/30* (2018.01)

(52) U.S. Cl.
CPC ........ *G06F 9/3842* (2013.01); *G06F 9/30069* (2013.01); *G06F 9/355* (2013.01)

(58) Field of Classification Search
CPC .................................................. G06F 9/3842
See application file for complete search history.

(56) References Cited

U.S. PATENT DOCUMENTS

| | | | |
|---|---|---|---|
| 7,082,520 B2 | 7/2006 | Bonanno et al. | |
| 7,234,046 B2 | 6/2007 | Su | |
| 7,681,021 B2* | 3/2010 | Schuler ................ | G06F 9/3806 712/238 |
| 9,250,912 B2 | 2/2016 | Bonanno et al. | |
| 9,298,465 B2 | 3/2016 | Bonanno et al. | |
| 9,563,427 B2 | 2/2017 | Gschwind | |
| 2006/0149947 A1 | 7/2006 | Su | |
| 2012/0311308 A1* | 12/2012 | Xekalakis ........... | G06F 9/30145 712/239 |
| 2013/0246751 A1* | 9/2013 | Bradbury ............ | G06F 9/30018 712/220 |
| 2014/0143526 A1* | 5/2014 | Xekalakis ............ | G06F 9/3848 712/239 |

(Continued)

OTHER PUBLICATIONS

Anonymously; "A Method and System for Improving Power Efficiency by Throttling Branch Prediction Search Rate Based on Queue Occupany," IPCOM000237562d, Jun. 24, 2014, 4 pages.

(Continued)

*Primary Examiner* — Jyoti Mehta
(74) *Attorney, Agent, or Firm* — Cantor Colburn LLP; Margaret McNamara

(57) ABSTRACT

A system includes a branch predictor and a processing circuit configured to perform a plurality of operations including storing a skip-over offset value in the branch predictor. The skip-over offset value defines a number of search addresses of the branch predictor to be skipped. The operations further include searching the branch predictor for a branch prediction. Responsive to finding the branch prediction, the searching of the branch predictor is re-indexed based on the skip-over offset value associated with the branch prediction.

17 Claims, 10 Drawing Sheets

(56) References Cited

U.S. PATENT DOCUMENTS

2017/0262287 A1    9/2017   Abdallah
2017/0037167 A1    12/2017   Bonanno et al.

OTHER PUBLICATIONS

IBM, "Configurable Microprocessor Branch Prediction for Performance and Power Savings," IPCOM000028112D, Apr. 26, 2004, 5 pages.
M. Huang, et al., "Customizing the Branch Predictor to Reduce Complexity and Energy Consumption," Appears in IEEE Micro 23(5): 12-25, Sep./Oct. 2003, 14 pages.
S. Mittal, et al., "A Survey for Techniques for Dynamic Branch Prediction," Computer Science—Hardware Architecture, Apr. 1, 2018, 37 pages.
W Chiao, et al., "Filtering of Unnecessary Branch Predictor Lookups for Low-power Processor Architecture," Journal of Information Science and Engineering 24, pp. 1127-1142 (2008).

* cited by examiner

| BTB index | Instruction addresses covered by specified BTB index | | | | | | |
|---|---|---|---|---|---|---|---|
| 0x100 (search) | 0x100 | 0x102 | 0x104 branch1 targ1= 0x202 | 0x106 | 0x108 | 0x10A | 0x10C | 0x10E |
| 0x200 (skip) | 0x200 | 0x202 targ1 | 0x204 | 0x206 | 0x208 | 0x20A | 0x20C | 0x20E |
| 0x210 (skip) | 0x210 | 0x212 | 0x214 | 0x216 | 0x218 | 0x21A | 0x21C | 0x21E |
| 0x220 (search) | 0x220 | 0x222 | 0224 | 0x226 | 0x228 | 0x22A branch 2 | 0x22C | 0x22E |

FIG. 5

Search without SKOOT: prediction every 6 cycles

| cycle-> address | 1 | 2 | 3 | 4 | 5 | 6 | 7 | 8 | 9 | 10 | 11 |
|---|---|---|---|---|---|---|---|---|---|---|---|
| 0x100 | index BTB | read BTB | read BTB | hit detect | report pred. 602 | | | | | | |
| 0x202 | | | | | index BTB | read BTB | read BTB | miss | | | |
| 0x210 | | | | | | index BTB | read BTB | read BTB | miss | | |
| 0x220 | | | | | | | index BTB | read BTB | read BTB | hit detect | report pred. (+6 cycs) 604 |

FIG. 6

Search with BTB SKOOT: prediction every 4 cycles

| cycle-><br>address | 1 | 2 | 3 | 4 | 5 | 6 | 7 | 8 | 9 | 10 | 11 |
|---|---|---|---|---|---|---|---|---|---|---|---|
| 0x100 | index BTB | read BTB | read BTB | hit detect | report pred. | | | | | | |
| 0x220 | | | | | index BTB | read BTB | read BTB | hit detect | report pred. (+4 cycs) | | |

SPRED Search without SKOOT: prediction every 4 cycles

| cycle-> address | 1 | 2 | 3 | 4 | 5 | 6 | 7 | 8 | 9 | 10 | 11 |
|---|---|---|---|---|---|---|---|---|---|---|---|
| 0x100 | index BTB | read BTB | read BTB | hit detect | report pred. 802 | | | | | | |
| 0x202 | | | index BTB | read BTB | read BTB | miss | | | | | |
| 0x210 | | | | index BTB | read BTB | read BTB | miss | | | | |
| 0x220 | | | | | index BTB | read BTB | read BTB | hit detect | report pred. (+4 cycs) 804 | | |

FIG. 8

SKIP-OVER OFFSET BRANCH PREDICTION

BACKGROUND

The present invention relates to computer systems, and more particularly, to skip-over offset branch prediction.

Branch prediction is a performance-critical component of a pipelined high-frequency microprocessor. It is used to predict the direction (taken vs. not taken) and the target address of each branch instruction. This is beneficial because it allows processing to continue along a branch's predicted path rather than having to wait for the outcome of the branch to be determined. A penalty is incurred if a branch is predicted incorrectly. A pipelined branch predictor takes several cycles to make a prediction.

Traditionally, branch prediction is used to steer the flow of instructions down a processor pipeline along the most likely path of code to be executed within a program. Branch prediction uses historical information to predict whether or not a given branch will be taken or not taken, such as predicting which portion of code included in an IF-THEN-ELSE structure will be executed based on which portion of code was executed in the past. The branch that is expected to be the first taken branch is then fetched and speculatively executed. If it is later determined that the prediction was wrong, then the speculatively executed or partially executed instructions are discarded and the pipeline starts over with the instruction proceeding to branch with the correct branch path, incurring a delay between the branch and the next instruction to be executed. Branch prediction structures have limited storage capacity and are constrained by access and search times.

SUMMARY

According to a non-limiting embodiment, a system includes a branch predictor and a processing circuit configured to perform a plurality of operations including storing a skip-over offset value in the branch predictor. The skip-over offset value defines a number of search addresses of the branch predictor to be skipped. The operations further include searching the branch predictor for a branch prediction. Responsive to finding the branch prediction, the searching of the branch predictor is re-indexed based on the skip-over offset value associated with the branch prediction.

According to a non-limiting embodiment, a method includes storing, by a processing circuit, a skip-over offset value in a branch predictor. The skip-over offset value defines a number of search addresses of the branch predictor to be skipped. The processing circuit searches the branch predictor for a branch prediction. Responsive to finding the branch prediction, the searching of the branch predictor is re-indexed based on the skip-over offset value associated with the branch prediction.

According to a non-limiting embodiment, a computer program product includes a computer readable storage medium having program instructions embodied therewith. The program instructions are executable by a processing circuit to perform a plurality of operations including storing a skip-over offset value in a branch predictor. The skip-over offset value defines a number of search addresses of the branch predictor to be skipped. The branch predictor is searched for a branch prediction. Responsive to finding the branch prediction, the searching of the branch predictor is re-indexed based on the skip-over offset value associated with the branch prediction.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is a block diagram illustrating a searching process according to a non-limiting embodiment;

FIG. 6 is a timing diagram illustrating a searching process without using a skip-over offset value;

FIG. 7 is a timing diagram illustrating a searching process using a skip-over offset value according to a non-limiting embodiment;

FIG. 8 is a timing diagram illustrating a searching process without using a skip-over offset value;

Figure 1:
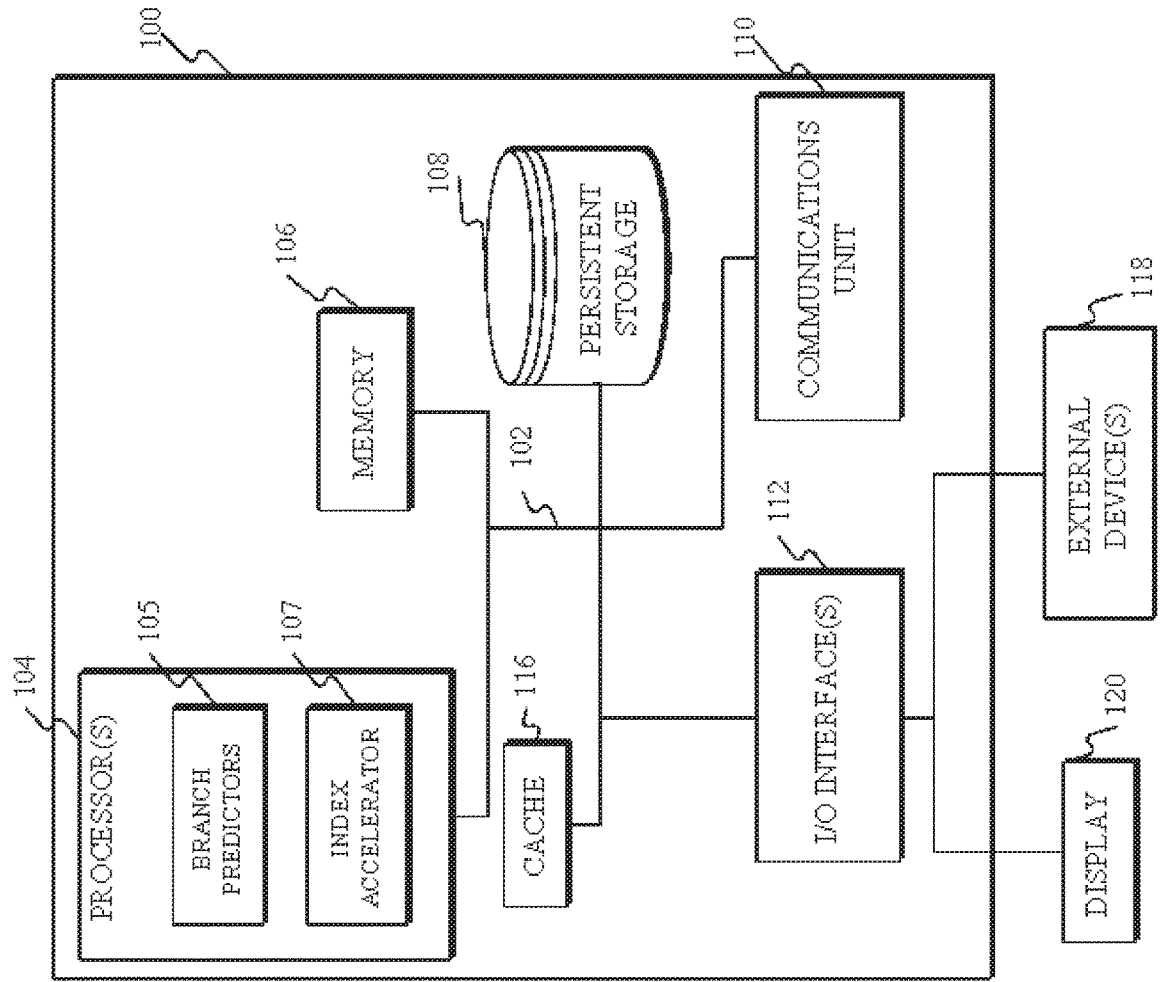
FIG. 1 is a block diagram illustrating a computer system in accordance with various embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in computer systems, branch prediction can be implemented using a plurality of structures in one or more processors. A branch target buffer (BTB) is a structure that stores branch and target information. Other structures, such as a branch history table (BHT), pattern history table (PHT), and multiple target table (MTT), can be included to store additional information used for branch direction and target prediction.

A BTB can be searched in parallel to and independently from instruction fetching to find upcoming branches, in which case it is called "lookahead branch prediction". Alternatively, the BTB can be accessed simultaneously with or after fetching instructions and determining instruction boundaries in order to provide a prediction for each encountered branch instruction, in which case it is called "synchronous branch prediction". In either case, the performance benefit of the BTB is a function of the accuracy of the prediction provided by the BTB and the latency to access the BTB.

Branches can be stored in BTBs and other structures as a function of a branch instruction address. Some bits of the branch instruction address can be used to index tables, and additional bits can be used as tags within the entries to reduce aliasing. When searching such structures, every address is typically checked. However, some sections of instruction address space do not contain any branches. In such cases, searching for branches takes time, thereby reducing prediction performance through increased latency and power consumption.

Turning now to an overview of the aspects of the invention, one or more embodiments of the invention address the above-described shortcomings of the prior art by performing skip-over offset branch prediction that allows branch predictor search processes to skip over addresses unlikely to contain any branch predictions. Skip-over offset branch prediction can be combined with other accelerators to reduce branch prediction latency. As one example, embodiments can use a hierarchical asynchronous lookahead branch predictor of a processor for a branch prediction process in combination with a stream-based branch prediction index accelerator (SPRED) and/or other branch prediction structures. A hierarchical asynchronous lookahead branch predictor includes a first-level branch predictor and a second-level branch predictor that is searched upon failing to locate a branch in the first-level branch predictor. The first-level branch predictor and the second-level branch predictor can each include one or more BTBs with different sizes and performance characteristics.

Asynchronous lookahead branch prediction is done asynchronously from a processor pipeline which begins with instruction fetching. Upon being restarted at a specified instruction address at the same time frame as instruction fetching, branch prediction independently searches the first-level branch predictor for the first branch at or after the restart address. Upon finding a branch, branch prediction logic reports the branch to instruction fetching logic and to pipeline logic to allow eventual correlation between branch predictions and instructions being decoded. Independently from the rest of the processor pipeline, the branch prediction logic re-indexes itself with the predicted target address of a predicted taken branch. For a predicted not-taken branch, the branch prediction logic continues searching sequentially looking for the next branch. This process then repeats. Indexing branch predictors, reading content, and determining whether or not there is a predicted taken branch and, if so, a target address, can take multiple processor cycles in modern high-frequency designs.

A first-level branch predictor is generally indexed using an instruction address and is incremented by a certain amount to continue searching sequentially for branches within a region of code. Each time a processor instruction stream is restarted, such as for a wrong branch, searching starts and a new stream is started. Therefore, each predicted taken branch starts a new stream. Embodiments can utilize stream length information from the SPRED to determine how to act on a potential first-level branch predictor miss. Full action, such as a full search of the second-level branch predictor, can be prevented when the SPRED indicates that the instruction address of the taken branch prediction ending a current stream being searched is greater than the current search address, when that current search address is far enough beyond the start point that it would otherwise have been reported as a level-1 miss when no branch predictions are found. The miss can be accelerated when the SPRED predicted the stream end early but no branch was found (e.g., before a fixed miss limit). In addition, SPRED-based predictions can be further accelerated using skip-over offset values (also referred to as SKOOTs) as further described herein.

The above-described aspects of the invention address the shortcomings of the prior art by storing skip-over offset information for searching branch predictors, such as a BTB. The skip-over offset information allows the branch predictor to skip over an offset-specified number of searches when re-indexing. This information can additionally be included in a smaller accelerator structure, such as the SPRED, and therefore used even when the SPRED is steering the indexing of the BTB. The skip-over offset information can also be stored throughout multiple levels of a branch prediction hierarchy, thereby enabling offset skipping after all dynamically predicted branches. Further, skip-over offset information can be incorporated in auxiliary structures, such as the MTT. Technical effects and benefits can include skipping unnecessary branch prediction searches after making branch predictions, thereby improving performance and reducing power consumption. Further, skip-over offset branch predictions can be incorporated into existing branch prediction structures, such that acceleration can be achieved after branch prediction re-indexing without adding separate support structures.

In a lookahead branch predictor, the use of skip-over offsets can provide additional value by accelerating subsequent branch predictions. This can be beneficial for performance because in such designs, eventually branch predictions are applied to instructions at which time the synchronization can stall instructions from proceeding down an instruction pipeline until the prediction is available. Skip-over offsets can also be beneficial for performance because branch predictions steer instruction fetching. Accelerating such predictions can accelerate instruction fetches which may hide a branch to target redirect penalty. The use of skip-over offsets can also hide instruction cache miss penalties.

Turning now to a more detailed description of aspects of the present invention, FIG. 1 depicts computer system 100, which is an example of a system that includes embodiments. Computer system 100 includes communications fabric 102, which provides communications between computer processor(s) 104 including branch predictors 105 and index accelerator 107, memory 106, persistent storage 108, communications unit 110, input/output (I/O) interface(s) 112, and cache 116. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses.

Memory 106 and persistent storage 108 are computer readable storage media. In this embodiment, memory 106 includes random access memory (RAM). In general, memory 106 can include any suitable volatile or non-volatile computer readable storage media. Cache 116 is a fast memory that enhances the performance of processors 104 by holding recently accessed data and data near accessed data from memory 106. Cache 116 can be distributed within and/or external to processors 104 and may include instructions (e.g., Icache) and/or data (e.g., Dcache).

Program instructions and data used to practice embodiments may be stored in persistent storage 108 for execution by one or more of the respective processors 104 via cache 116 and one or more memories of memory 106. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Program instructions and data used to practice embodiments may be downloaded to persistent storage 108 through communications unit 110.

I/O interface(s) 112 allows for input and output of data with other devices that may be connected to each computer system. For example, I/O interface 112 may provide a connection to external devices 118 such as a keyboard, keypad, a touch screen, and/or some other suitable input device. External devices 118 can also include portable computer readable storage media such as, for example, thumb drives, portable optical or magnetic disks, and memory cards. Software and data used to practice embodiments of can be stored on such portable computer readable storage media and can be loaded onto persistent storage 108 via I/O interface(s) 112. I/O interface(s) 112 also connect to a display 120. Display 120 provides a mechanism to display data to a user and can be, for example, a computer monitor.

Branch predictors 105 and index accelerator 107 can include one or more sets of hardware logic components capable of making and storing predictions for the location of branches in an instruction stream. Example embodiments of the branch predictors 105 and index accelerator 107 are further described herein in reference to FIGS. 2-10.

Figure 2:
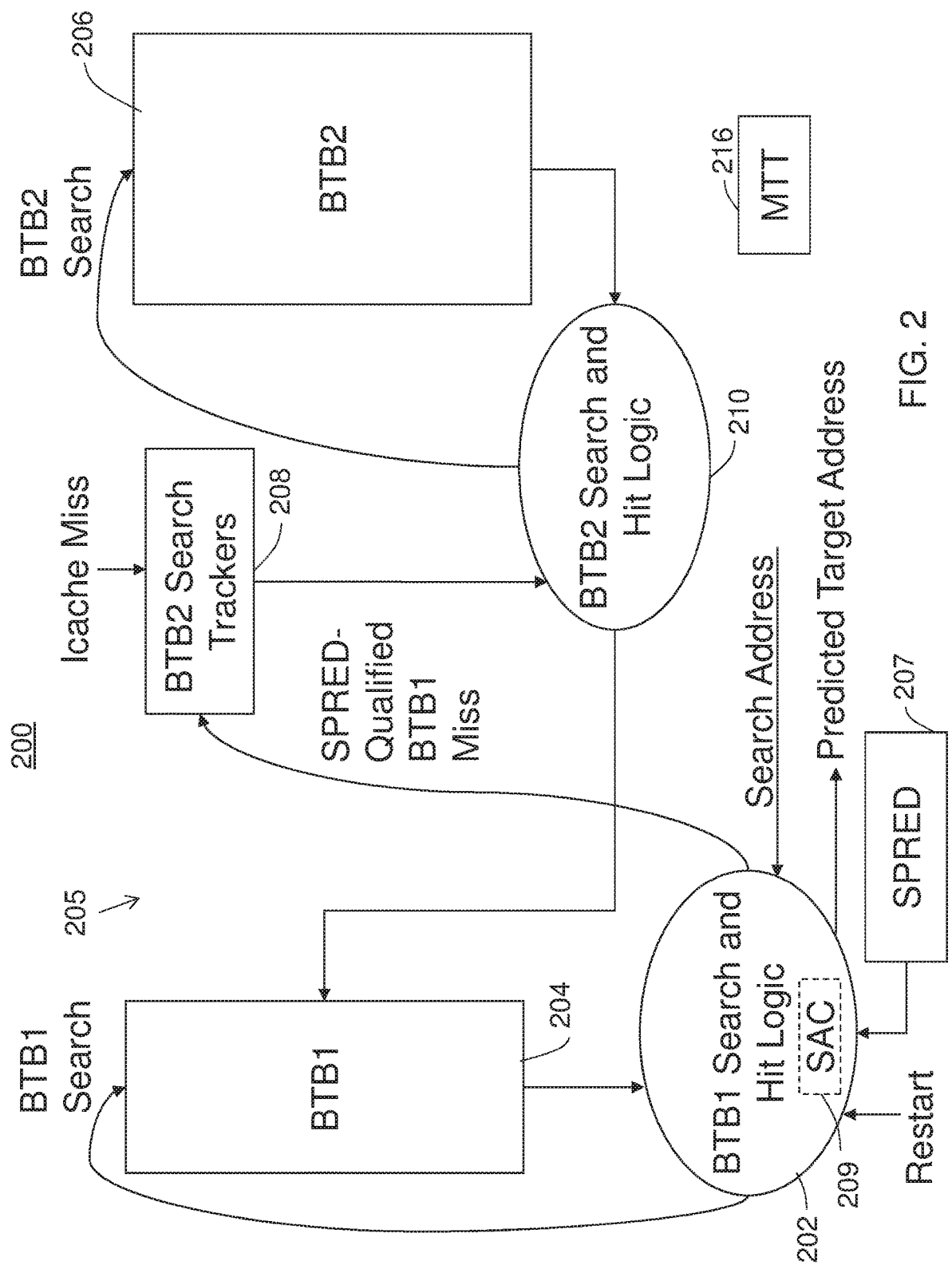
FIG. 2 is a block diagram of a system according to a non-limiting embodiment.

FIG. 2 depicts a system 200 including a hierarchical asynchronous lookahead branch predictor 205 as an embodiment of the branch predictors 105 of FIG. 1 and a SPRED 207 as an embodiment of the index accelerator 107 of FIG. 1. The example hierarchical asynchronous lookahead branch predictor 205 of FIG. 2 includes a first-level branch predictor (BTB1) 204, BTB1 search and hit logic 202, a second-level branch predictor (BTB2) 206, BTB2 search trackers 208, and BTB2 search and hit logic 210. The system 200 can also include auxiliary structures to support branch prediction, such as a multiple target table (MTT) 216. The MTT 216 is a pattern-based indexed table for predicting target addresses of branches with multiple targets. The BTB1 search and hit logic 202 controls access and updates of BTB entries in the BTB1 204, while the BTB2 search and hit logic 210 controls access and updates of BTB entries in the BTB2 206. In an exemplary embodiment, BTB1 204 is a primary or first-level BTB, and BTB2 206 is a secondary or second-level BTB. BTB2 search trackers 208 can be configured as a filter for searching and controlling the bulk transfer of multiple BTB entries from the BTB2 206 based on a SPRED-qualified BTB1 miss. The SPRED-qualified BTB1 miss can be further limited by an instruction cache miss associated with a same region of memory. While the BTB1 search and hit logic 202, the SPRED 207, and the BTB2 search and hit logic 210 are depicted separately, it will be understood that they can be combined into a single logic block or further subdivided, for instance, in a processing circuit of the processors 104 of FIG. 1.

Figure 3:
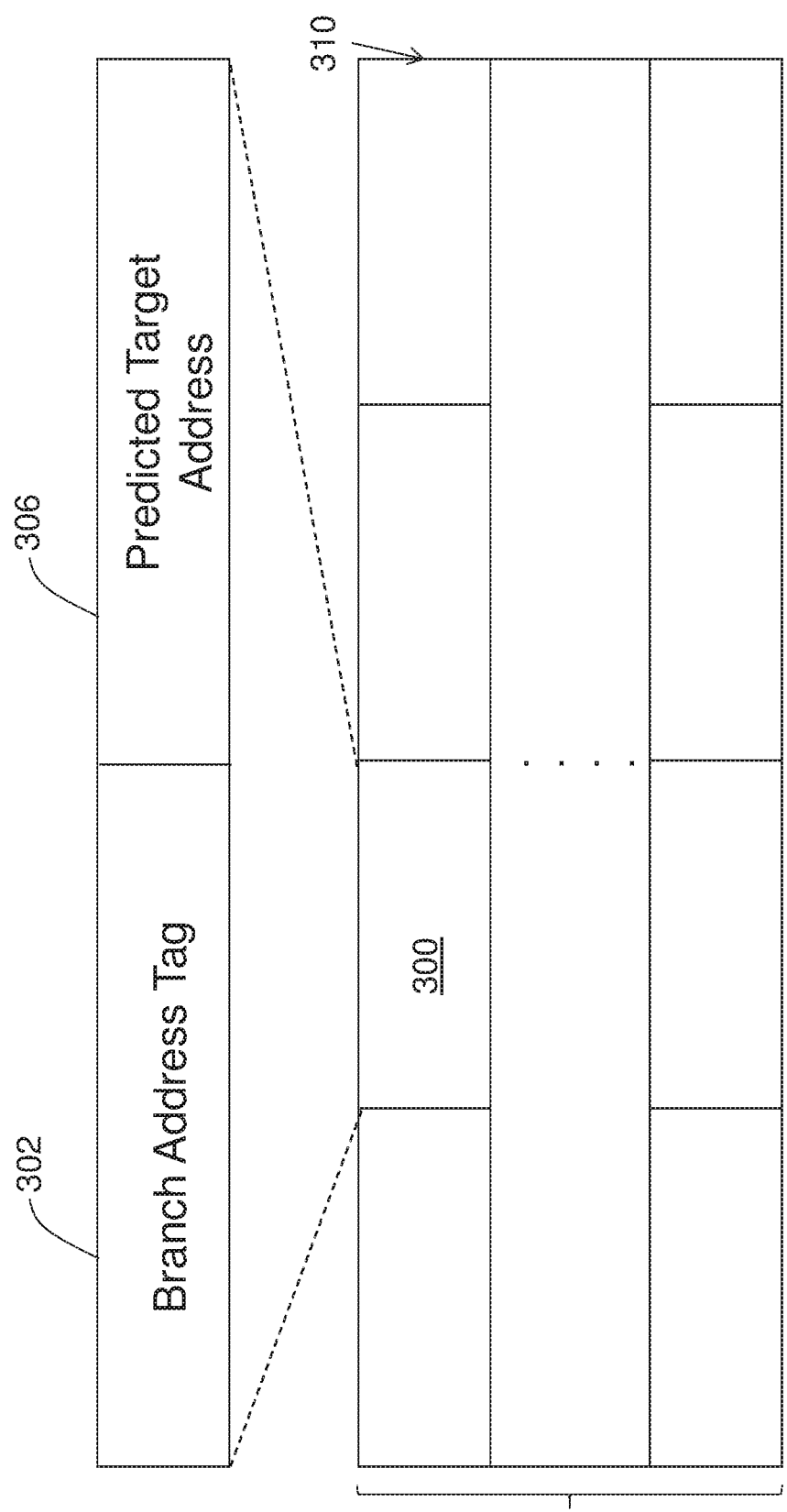
FIG. 3 is a block diagram illustrating a branch target buffer according to a non-limiting embodiment.

Each of the BTB1 204 and BTB2 206 is set associative, including multiple sets of BTB entries. The BTB2 206 is a higher-level cache of branch prediction information. The capacity of the BTB2 206 is greater than the capacity of the BTB1 204 to store entries, and the BTB1 204 covers a larger or equal to instruction footprint than instruction cache of the cache 116 of FIG. 1. A general example of a BTB entry is depicted in FIG. 3 as BTB entry 300 (also referred to as entry 300), which can include a branch address tag 302 and a predicted target address 306. With continued reference to FIGS. 1-3, the branch address tag 302 is used to locate an entry within a BTB row 310, where each of the BTB1 204 and BTB2 206, of FIG. 2 can include multiple BTB rows 310 and multiple set associative BTB entries per BTB row 310. The BTB1 204 and BTB2 206 can have different numbers of BTB rows 310 and columns relative to each other. Each BTB entry 300 can include other branch prediction information (not depicted), such as a branch direction to indicate whether the associated branch was taken or not taken.

In an exemplary embodiment, a search address corresponding to a restart of instruction fetching in processors 104 of FIG. 1 is sent to the BTB1 search and hit logic 202 which thereafter operates asynchronously from instruction fetching until the next restart. When looking for branch predictions, the BTB1 204 is read and can provide a branch prediction if it contains an entry with a branch address tag 302 matching the search address. The BTB1 204 provides input to BTB1 search and hit logic 202 to determine whether a match or "hit" is located based on the search address. If a match is found, the BTB1 search and hit logic 202 outputs a predicted target address. If a match is not found, sequential searching of the BTB1 204 continues over a search range before declaring a BTB1 miss and taking further action through BTB2 search trackers 208.

The search range of the BTB1 204 can be established by the SPRED 207. In embodiments, the SPRED 207 determines a predicted stream length between an instruction address and a taken branch ending an instruction stream. The BTB1 204 can be searched for a branch prediction in one or more entries 300 in a search range bounded by the instruction address and the predicted stream length. A search of the BTB2 206 can be triggered based on failing to locate the branch prediction in the search range.

In some embodiments, the BTB2 search trackers 208 can be omitted. In embodiments that include the BTB2 search trackers 208, BTB1 misses may be tracked on the granularity of BTB2 pages. For example, if a BTB2 bulk transfer granularity (page size) is 4 kilobytes (KB), then any qualified BTB1 miss in the same 4 KB page is considered the same page miss. If a search tracker in the BTB2 search trackers 208 is active for a BTB1 miss in a particular page, any subsequent misses in that same page are ignored while that search tracker is active and while that page address is identified as recently completed. Upon detecting a BTB1 miss that is a duplicate of an active search tracker in the BTB2 search trackers 208 that has an instruction cache miss validity indicator of valid (e.g., bit set to '1'), but the BTB1 miss validity indicator is invalid (e.g., bit set to '0'), then the associated BTB1 miss validity indicator of the search tracker can be set to valid (e.g., '1').

Independently from BTB1 misses, as instruction cache misses occur, they can be sent to the BTB2 search trackers 208. Each search tracker can also track instruction cache misses. Instruction cache misses can be tracked on the same page granularity as BTB2 bulk transfers, or a different instruction cache granularity. If the instruction cache miss address matches the address of a tracker active for a BTB1 miss (a BTB1 miss address), but not an instruction cache miss, the instruction cache miss validity indicator can be set valid (e.g., '1').

Active search trackers can be used to perform searches of the BTB2 206. In exemplary embodiments, whenever a search tracker is active for both a BTB1 miss and an instruction cache miss, a full page transfer can occur. All rows of the BTB2 206 within the page are searched, and hits are written into the BTB1 204. Search trackers that are active for both a BTB1 miss and instruction cache miss can remain active until the BTB2 bulk transfer completes.

The SPRED 207 can track an index to a row corresponding to the address of the first instruction received in an instruction stream and the information included in the current row of the SPRED 207 is read. In various embodiments, depending on the width of the address space, various numbers of unique instruction addresses may be present, and as a result different numbers of rows may be required for SPRED 207 in various embodiments. Generally, only a subset of bits of the instruction address for a given instruction is used to identify the row number in SPRED 207 which contains branch prediction data for the given instruction. For example, in an embodiment where 32-bit instruction addresses are used (including bits 0 through 31), each instruction address can be split into a left tag (L-tag) made up of the first 17 bits of the instruction address (bits 0 through 16), an index made up of the next 10 bits of the instruction address (bits 17 through 26), and a right tag (R-tag) made up of the final 5 bits of the instruction address (bits 27 through 31). In this embodiment, because only the ten bits of the instruction address used as the index are used to determine the row in SPRED 207 in which the branch prediction data is stored for that instruction, SPRED 207 includes 1024 rows. Further, in some embodiments SPRED 207 is designed to contain the same number of rows as BTB1 204 and be indexed based on the same 10 bits of the instruction address as BTB1 204. In other embodiments, BTB1 204 and SPRED 207 use different numbers of bits to determine which row in the respective tables contain the branch prediction information for that instruction. In these embodiments, it is possible for BTB1 204 and SPRED 207 to have different numbers of rows while still allowing for correct operation.

Data contained in a row of SPRED 207 corresponding to the current instruction can be read to determine if a branch is expected for the current instruction. It should be appreciated that one row of SPRED 207 can correspond to a large number of instruction addresses in embodiments where aliasing is used, and that in these embodiments multiple instruction addresses can correspond to the same row in SPRED 207. In one embodiment, the first bit of data stored in the current row of SPRED 207 contains a binary indication of whether or not a taken prediction is present in the corresponding row of BTB1 204. In this embodiment, the determination of whether or not a taken prediction is present in the corresponding row of BTB1 204 is made using an offset field indicating how many searches of the BTB1 204 need to be made before encountering the taken branch to end the stream.

The processor(s) 104 can identify the target address of the first taken branch prediction indicated in the currently selected row of SPRED 207. In some embodiments, an additional structure such as a changing target buffer (CTB) may be used to predict the target address for the first taken prediction indicated by one or more rows of SPRED 207. In these embodiments, the target address of the first taken prediction may be omitted, and the indication of the column of BTB1 204 can be used to more easily identify the target address of the first taken prediction using the additional structure such as the CTB.

A prediction can be drawn from BTB1 204 simultaneously while a prediction is drawn from SPRED 207. The prediction drawn from SPRED 207 can be considered valid until confirmed or disputed by the prediction drawn from BTB1 204. In various embodiments, the bits of data included in SPRED 207 can be the bits of data used to re-index SPRED 207 to the target address of the prediction. In embodiments where more or fewer bits of data are used to re-index SPRED 207, the length of the number included in a given row of SPRED 207 can differ. Once the target address of the first taken branch prediction is identified, processor(s) 104 re-indexes SPRED 207 and BTB1 204 to the rows corresponding to the target address for the first taken branch prediction. Once SPRED 207 and BTB1 204 are re-indexed, processor(s) 104 re-starts the process of searching BTB1 204 and SPRED 207 for branch predictions at the new target address.

The processor(s) 104 can determine if there is more address space to search. If search logic, such as the BTB1 search and hit logic 202, decides that searching should stop, then branch prediction searching ends. A restart begins a new search stream in branch prediction logic. Once a restart occurs, processor 104 may keep searching sequentially for branches. In other aspects, processor 104 may also accelerate re-indexing whenever SPRED 207 finds an end of the stream, so processor 104 redirects branch predictors 105 to start searching into a new stream. If a request for a restart is received with an instruction address following the previous instruction address, then processor 104 can continue searching the next sequential rows of BTB1 204 and SPRED 207 for predictions of the presence of branches. In general, the indexes of BTB1 204 and SPRED 207 can be incremented because the next row in BTB1 204 and SPRED 207 contains branch prediction information for the next sequential set of instructions present in the instruction stream.

The SPRED 207 can determine a predicted exit point or taken branch that ends a stream. For instance, at the start of stream 0, a start instruction address of 0x00 can be used to index into the SPRED 207, and output of the SPRED 207 can indicate the exit point is X locations/instructions from the start of stream 0. The output of SPRED 207 can be used to accelerate indexing into stream 1 once X locations/instructions were searched in stream 0. Indexing can advance with a start instruction address to produce an output of Y locations/instructions, indicating where the exit point of stream 1 resides, etc. With this approach, the SPRED 207 may only need to be read once per stream, with the starting search address of the stream (for example). An entry of the SPRED 207 can include information containing an offset to a predicted exit point as a predicted stream length between an instruction address and a taken branch ending an instruction stream.

In some embodiments, an accuracy counter 209 (i.e., a SPRED accuracy counter) is updated based on a number of times that the SPRED 207 correctly predicts the predicted stream length and the correct prediction is used. Use of the search range, as bounded by the instruction address and the predicted stream length, can be based on determining that the accuracy counter 209 is above an accuracy threshold. If the accuracy of the SPRED 207 is below an accuracy threshold, then the SPRED 207 can be deemed inaccurate, resulting in disabling use of the search range and enabling use of a default search depth based on determining that the accuracy counter 209 is below the accuracy threshold. For instance, a default search range can be set to a predetermined value, such as searching for three entries before declaring a miss. In contrast, the SPRED 207 can set a search range that is greater or lesser than the default search range based on a predicted stream length between an instruction address and a taken branch ending the instruction stream.

Although the example of FIG. 2 depicts a two-level BTB hierarchy, it will be understood that embodiments can include a single level of BTB or additional BTB levels, e.g., a three-level BTB. Further, the SPRED 207 and/or MTT 216 can be omitted in some embodiments.

Figure 4:
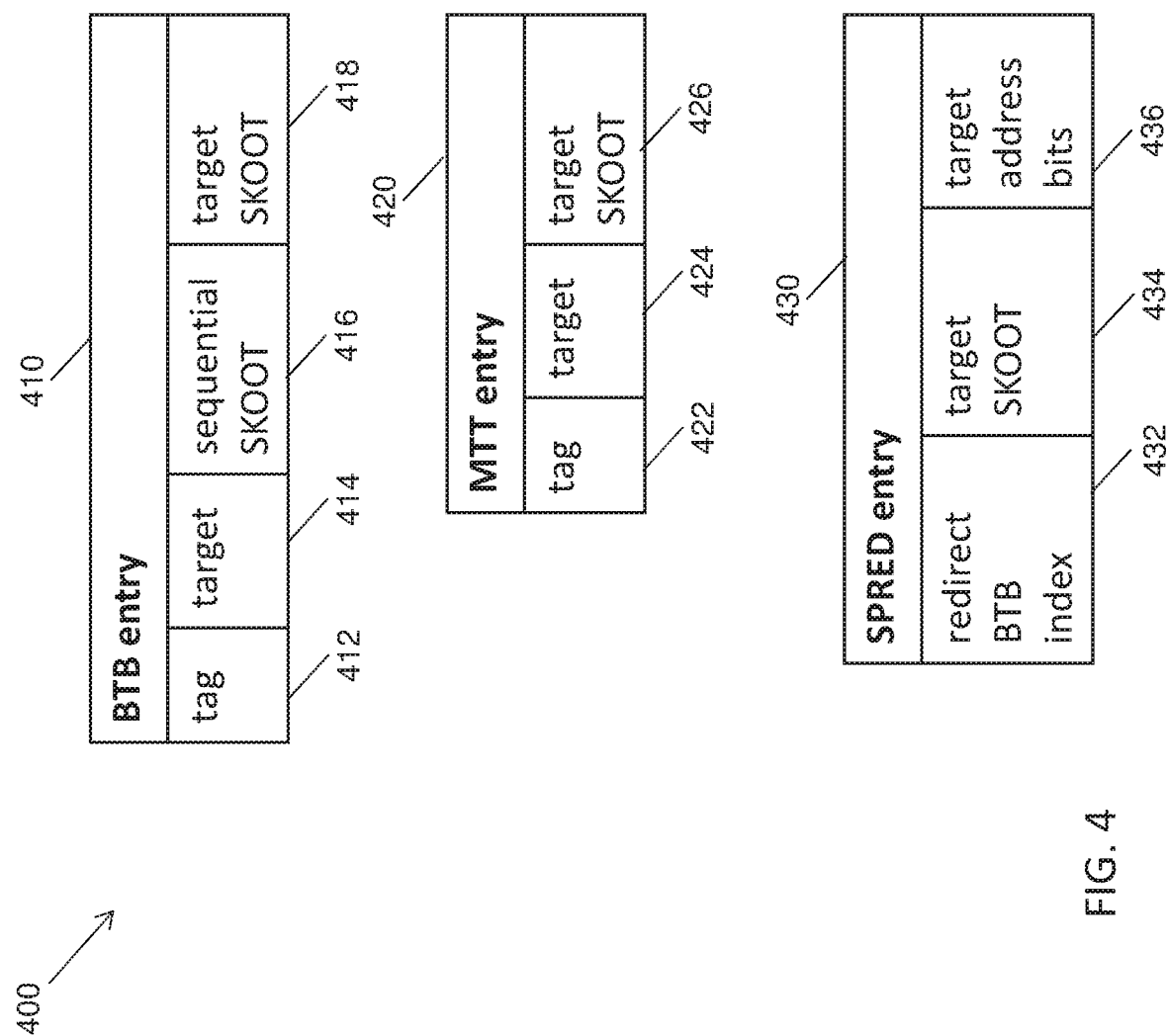
FIG. 4 is a block diagram illustrating entries of branch predictors according to a non-limiting embodiment.

To further accelerate searching, embodiments incorporate skip-over offset values in one or more of the branch predictors 105 and/or index accelerator 107 of FIG. 1, which can be embodied in the BTB1 204, BTB2 206, SPRED 207, and/or MTT 216. FIG. 4 depicts an example of entries 400 in various branch predictors that can be modified to include skip-over offset values. A BTB entry 410, can include a tag 412, such as the branch address tag 302 of FIG. 3, and a target 414, such as the predicted target address 306 of FIG. 3. Further, the BTB entry 410 can include a skip-over offset value of a sequential path 416 and/or a skip-over offset value of a taken target path 418. The skip-over offset value of the sequential path 416 can be used when a branch is predicted not-taken, and the skip-over offset value of a taken target path 418 can be used when a branch is predicted taken. Although the skip-over offset value of the sequential path 416 and the taken target path 418 are both depicted in the example of FIG. 4, it will be understood that either or both can be included. For example, skip-over offset value acceleration may only be applied on taken branch redirects, but not upon not-taken predictions when searching would have to proceed sequentially. As a further example, both the skip-over offset value of the sequential path 416 and the taken target path 418 can accelerate re-indexing regardless of how a branch is predicted.

In some embodiments, skip-over offset value information (e.g., skip-over offset value of the sequential path 416 and the taken target path 418) can be maintained in the BTB1 204 or can be maintained in multiple levels of a BTB hierarchy, which in this example, includes the BTB2 206. If skip-over offset value information is not maintained in the BTB2 206, the BTB2 search and hit logic 210 may not perform skipping of searches that are supported by the BTB1 search and hit logic 202.

An example of how 3-bit values, which provide 8 states, can be encoded to represent skip-over offset value of the sequential path 416 and/or the taken target path 418 is provided in table 1. In the example of table 1, there are two "skip 0" states. State 0 is a known offset of 0, while state 7 is an unknown offset. The other states are known offsets. The states represent a minimum search offset encountered along a path before encountering another branch that is being tracked in the branch predictor 205 of FIG. 2. State 6 is an example of a "6+" offset, where search processing can skip six locations, and if no predictions are found, searching can continue sequentially. Similarly, after other skip values (1-5 in the example of table 1), searching can continue sequentially if a prediction is not found after the skipping.

TABLE 1

3-bit example of skip-over offset values

| State | Description |
| --- | --- |
| 0 | Known offset 0 |
|   | Skip 0 |
| 1 | Known offset 1 |
|   | Skip 1 |
| 2 | Known offset 2 |
|   | Skip 2 |
| 3 | Known offset 3 |
|   | Skip 3 |

TABLE 1-continued 3-bit example of skip-over offset values

| State | Description |
|---|---|
| 4 | Known offset 4 Skip 4 |
| 5 | Known offset 5 Skip 5 |
| 6 | Known offset 6+ Skip 6 |
| 7 | Unknown offset Skip 0 |

In embodiments, upon a new install into a BTB, such as BTB1 204 of FIG. 2, a skip-over offset value can be installed into an "unknown offset" state (e.g., state 7 in table 1), which results in not skipping any searches. Upon encountering a surprise branch that gets installed into the BTB after a prior dynamically predicted branch, or upon a dynamically predicted branch; if the predicted skip-over offset value was unknown (e.g., state 7), the now known skip-over offset value can be written. Otherwise, if the predicted skip-over offset value was too large, the state can be updated by writing a now known lower skip-over offset value to ensure that the newly encountered surprise branch will not subsequently be skipped over when making branch predictions. Other embodiments could reset the target SKOOT value to the "unknown offset" state upon updating the target in the BTB entry upon a mispredicted target address.

FIG. 4 also depicts an example of an MTT entry 420 that can be stored in the MTT 216 of FIG. 2. The MTT entry 420 can include a tag 422 and a target 424 for pattern-based indexing to predict target addresses of branches with multiple targets. For example, a same instruction address may branch to different target addresses, such as a return instruction that returns to different addresses when called from various subroutines. Although the MTT 216 may not need to store a skip-over offset value, the MTT entry 420 can store a target skip-over offset value 426. When implemented as part of the BTB entry 410, the skip-over offset value of the taken target path 418 can handle multiple targets, for instance, by being set to a lowest offset encountered along all target paths. In some embodiments, by including the target skip-over offset value 426 in the MTT entry 420, the MTT 216 can store a skip-over offset value associated with each particular target address encountered, thereby providing better performance and power savings at the expense of additional tracking of the information in the MTT 216.

FIG. 4 also depicts an example of a SPRED entry 430 that can be implemented as part of the SPRED 207 of FIG. 2. Each SPRED entry 430 can represent a BTB taken branch prediction leaving a stream of instructions. A redirect BTB index 432 of the SPRED entry 430 can include index bits to use. A skip-over offset-enabled instance of the SPRED 207 can store a target address index plus a skip-over offset value instead of only a target address. A skip-over offset-enabled SPRED can also store a skip-over offset value, such as a target skip-over offset value 434 to compare against a BTB/MTT based prediction (e.g., skip-over offset value of a taken target path 418 or a target skip-over offset value 426). When the target skip-over offset value 434 does not match the skip-over offset value of a taken target path 418, any SPRED-initiated searches can be canceled, and a later BTB-time-frame re-index may occur. The SPRED entry 430 may also contain target search address bits 436 representing the offset into a BTB target line, with index bits to re-index the SPRED 207. The target search address bits 436 can be compared against the target 414 of the BTB entry 410 to ensure that the SPRED entry 430 is used correctly. Furthermore, when the target skip-over offset value 434 is zero, the target search address bits 436 can be used as part of a search address for a first search initiated by the SPRED 207. The target address bits 436 may not be used as part of the search address, which can contain zeros, when a skip amount is non-zero.

FIG. 5 depicts an example instruction sequence 500, with a plurality of BTB indices 502 and instruction addresses 504, where a first branch 506 is located at instruction address 0x104 with a target instruction address of 0x202, as a target 508. A next branch instruction address in the instruction sequence 500 can be located at instruction address 0x22A, which is a next branch 510. In this example, it is assumed that a corresponding BTB is organized based on a 16-byte line. Thus, with a 64-bit instruction address, the least significant bits 60:63 would be stored as tag bits within each BTB entry, such as tag 412 in BTB entry 410 of FIG. 4. Address bits X:59 can be used to index the BTB, such as BTB1 204 of FIG. 1. The value of X can be based on a table depth. Additional tag bits, Y:X−1, can be maintained within each BTB entry 410 to reduce aliasing. Within one row of the BTB1 204, there can be some number of BTB entries 410 based on set associativity. Rather than an incremental examination of the BTB indices 502 sequentially at and after the target 508, embodiments can use a skip-over offset value in searching for the next branch 510 after the first branch 506. At line 0x200, where the target 508 is located, there are no branches, and at line 0x210 there are no branches, thus searching for branches can skip the BTB indices 502 of the target 508 at 0x200 and line 0x210 before searching line 0x220 for the next branch 510.

The examples of FIGS. 6-9 assume a lookahead branch predictor where a branch predictor is searched asynchronously from and ahead of an instruction fetch process. Embodiments, however, can also be utilized in an inline branch predictor to save power by not searching for branches that can be skipped over based on a skip-over offset value. Timing diagrams 600, 700, 800, and 900 illustrate processing pipelines that show how skip-over offset values can impact cycle timing either with or without SPRED acceleration.

Timing diagram 600 continues with the example instruction sequence 500 of FIG. 5, where a line address 0x100 includes the first branch 506 at instruction address 0x104. The timing diagram 600 represents an example search of a BTB, such as BTB1 204 of FIG. 2, and does not include acceleration from skip-over offsets or the SPRED 207 of FIG. 2. In the example of FIG. 6, cycles 1-5 include time for BTB indexing, BTB reading, hit detecting, and prediction reporting 602. In cycle 5, BTB indexing is performed for instruction address 0x202 for the target 508, and after BTB reading in cycles 6 and 7, a branch prediction miss is detected in cycle 8. At line address 0x210, branch prediction searching continues with BTB indexing at cycle 6, BTB reading in cycles 7 and 8, and a branch prediction miss at cycle 9. At line address 0x220, branch prediction searching continues with BTB indexing at cycle 7, BTB reading in cycles 8 and 9, hit detection at cycle 10, and prediction reporting 604 at cycle 11. Thus, a cycle interval between the prediction reporting 602 and 604 is six cycles in this example.

Timing diagram 700 illustrates the example instruction sequence 500 of FIG. 5 with skip-over offsets enabled but does not include the use of the SPRED 207 of FIG. 2. In the example of FIG. 7, cycles 1-5 include time for BTB indexing, BTB reading, hit detecting, and prediction reporting 702. Rather, than re-indexing to the target branch 508, a skip-over offset value stored with a BTB entry for the first branch 506 may indicate that two lines of instruction addresses can be skipped, resulting in BTB indexing to line address 0x220, thus skipping searching of addresses between the target branch 508 and address lines prior to the next branch 510 at instruction address 0x22A. Pipeline processing at line address 0x220 continues with BTB reads at cycles 6 and 7, BTB hit detection at cycle 8, and prediction reporting 704 at cycle 9. Thus, a cycle interval between the prediction reporting 702 and 704 is four cycles in this example, which is a two-cycle improvement over the example of FIG. 6.

Timing diagram 800 continues with the example instruction sequence 500 of FIG. 5, where a line address 0x100 includes the first branch 506 at instruction address 0x104. In contrast to the example of FIG. 6, timing diagram 800 uses the SPRED 207 of FIG. 2 but does not use skip-over offsets. In the example of FIG. 8, cycles 1-5 include time for BTB indexing, BTB reading, hit detection, and prediction reporting 802. In cycle 3, the SPRED 207 enables early BTB indexing at instruction address 0x202 for the target 508, and after BTB reading in cycles 4 and 5, a branch prediction miss is detected in cycle 6. At line address 0x210, branch prediction searching continues with BTB indexing at cycle 4, BTB reading in cycles 5 and 6, and a branch prediction miss at cycle 7. At line address 0x220, branch prediction searching continues with BTB indexing at cycle 5, BTB reading in cycles 6 and 7, hit detection at cycle 8, and prediction reporting 804 at cycle 9. Thus, a cycle interval between the prediction reporting 802 and 804 is four cycles in this example, which is equivalent to only using skip-over offsets without the SPRED 207 in the example of FIG. 7.

Figure 9:
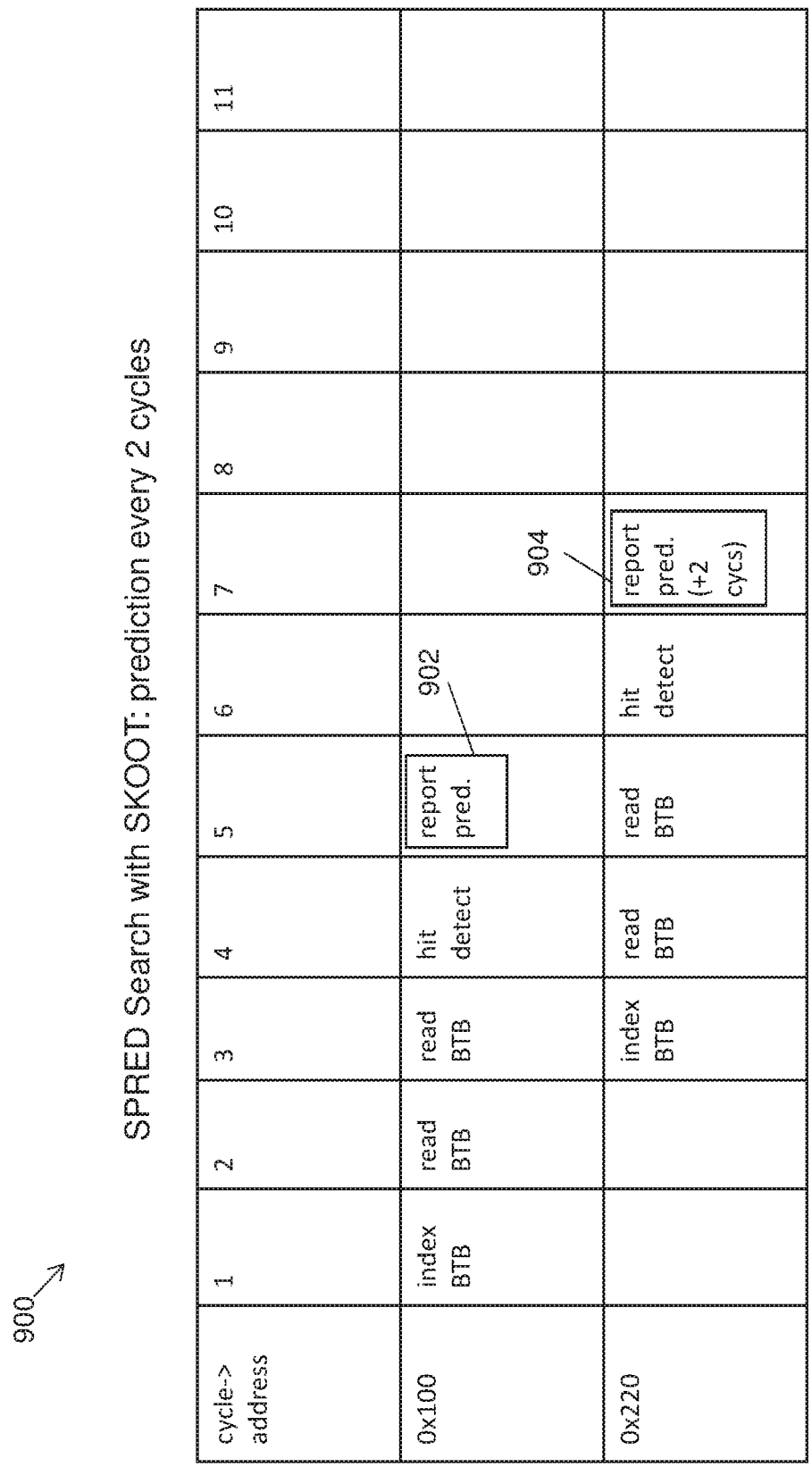
FIG. 9 is a timing diagram illustrating a searching process using a skip-over offset value according to a non-limiting embodiment.

Timing diagram 900 illustrates the example instruction sequence 500 of FIG. 5 with skip-over offsets enabled and also uses the SPRED 207 of FIG. 2. In the example of FIG. 9, cycles 1-5 include time for BTB indexing, BTB reading, hit detection, and prediction reporting 902. Rather, than re-indexing to the target branch 508, a skip-over offset value stored with a BTB entry for the first branch 506 may indicate that two lines of instruction addresses can be skipped, resulting in BTB indexing to line address 0x220, thus skipping searching of addresses between the target branch 508 and address lines prior to the next branch 510 at instruction address 0x22A. The SPRED 207 enables earlier BTB indexing at cycle 3, rather than cycle 5 as in the example of FIG. 7. Pipeline processing at line address 0x220 continues with BTB reads at cycles 4 and 5, BTB hit detection at cycle 6, and prediction reporting 904 at cycle 7. Thus, a cycle interval between the prediction reporting 902 and 904 is four cycles in this example, which is a two-cycle improvement over the examples of FIGS. 7 and 8.

Figure 10:
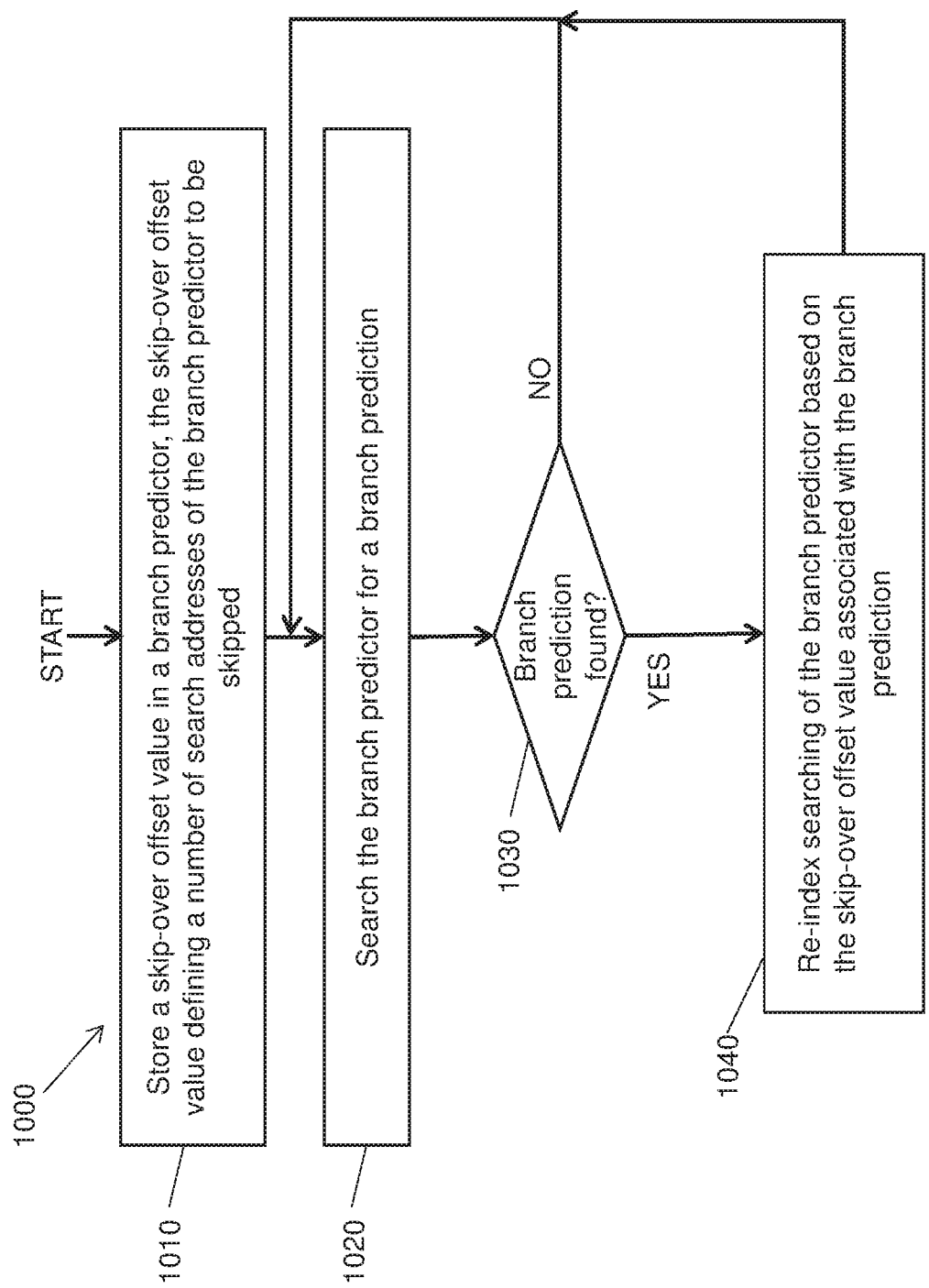
FIG. 10 is a flow diagram illustrating a method according to a non-limiting embodiment.

Turning now to FIG. 10, a flow diagram of a process 1000 is generally shown in accordance with an embodiment. The process 1000 is described with reference to FIGS. 1-10 and may include additional steps beyond those depicted in FIG. 10. The process 1000 can be performed by a processing circuit of the processors 104 of FIG. 1, that may include, for example, the BTB1 search and hit logic 202, the SPRED 207, and/or the BTB2 search and hit logic 210 of FIG. 2.

At block 1010, system 200 can store a skip-over offset value in a branch predictor 205, where the skip-over offset value defines a number of search addresses of the branch predictor 205 to be skipped. At block 1020, a processing circuit of the system 200 can search the branch predictor 205 for a branch prediction. At block 1030, the system 200 can determine whether a branch prediction is found. If a branch prediction is not found, the process 1000 can return to block 1020. At block 1040, responsive to finding the branch prediction at block 1030, the system 200 can re-index the searching of the branch predictor 205 based on the skip-over offset value associated with the branch prediction. Re-indexing can be performed for sequential and/or a target address-based skip-over offset values the branch prediction. In some embodiments, sequential increments may be used on not-taken predictions in a search, e.g. in a youngest such branch, to skip a number of sequential searches. Sequential searching can be pipelined in recognizing how far sequential searching has advanced and how many additional sequential searches can be skipped. After performing block 1040, the process 1000 can return to block 1020.

In embodiments, if a surprise branch is detected that was unpredicted by the branch predictor 205, the system 200 can adjust the skip-over offset value of a previous branch prediction in the branch predictor 205 based on the surprise branch.

When a new branch prediction is available, the new branch prediction can be installed in the branch predictor 205, and the skip-over offset value of the new branch prediction can be assigned to an unknown offset state with a skip of zero. The skip-over offset value of the new branch prediction can be updated based on a next encountered branch after the new branch prediction is taken.

As previously described with respect to FIGS. 2 and 4, the branch predictor 205 can include various branch prediction structures. For example, the branch predictor 205 can include one or more BTB, such as BTB1 204 and BTB2 206, having BTB entries 410. Tracking of the skip-over offset value in a BTB entry 410 can be performed for either or both of a sequential path and a taken target path. Further or as an alternative, the branch predictor 205 can include an MTT 216 with MTT entries 420. A skip-over offset value associated with a target address 424 can be stored in the MTT 216, such as in a target skip-over offset value 426 of an MTT entry 420. The skip-over offset value associated with the target address 424 can be set to a lowest offset encountered along all target paths. Further or as an alternative, the system 200 can include a SPRED 207, where a redirect BTB index 432 is stored in a SPRED entry 430 and may include a combination of a target address index and the skip-over offset value. Searching can be adjusted based on a result of comparing the skip-over offset value to a branch prediction of a BTB, such as BTB1 204 or BTB2 206.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:
a branch predictor comprising a branch target buffer;
a stream-based branch prediction index accelerator; and
a processing circuit configured to perform a plurality of operations comprising:
storing a first skip-over offset value in the branch predictor, the first skip-over offset value defining a number of search addresses of the branch predictor to be skipped;
storing a redirect index of the branch target buffer in the stream-based branch prediction index accelerator, wherein the redirect index is stored with a second skip-over offset value and a target address representing an offset into a target line of the branch target buffer;

searching the branch predictor for a branch prediction;

responsive to finding the branch prediction, re-indexing the searching of the branch predictor based on the first skip-over offset value associated with the branch prediction; and adjusting the searching based on a result of comparing the first skip-over offset value of the branch predictor with the second skip-over offset value of the stream-based branch prediction index accelerator.

2. The system of claim 1, wherein the processing circuit is further configured to perform operations comprising:

detecting a surprise branch that was unpredicted by the branch predictor or a predicted branch; and adjusting a previous skip-over offset value of a previous branch prediction in the branch predictor based on the surprise branch or the predicted branch.

3. The system of claim 1, wherein the processing circuit is further configured to perform operations comprising:

installing a new branch prediction in the branch predictor;

assigning a new skip-over offset value of the new branch prediction to an unknown offset state comprising a skip of zero; and updating the new skip-over offset value of the new branch prediction, the updating performed based on encountering a next branch.

4. The system of claim 1, wherein the processing circuit is further configured to perform operations comprising:

tracking the first skip-over offset value in the branch target buffer for either or both of a sequential path and a taken target path.

5. The system of claim 1, wherein the branch predictor further comprises a multiple target table, and the processing circuit is further configured to perform operations comprising:

tracking a third skip-over offset value in the multiple target table.

6. The system of claim 5, wherein the third skip-over offset value is set to a lowest offset encountered along all target paths.

7. A method comprising:

storing, by a processing circuit, a first skip-over offset value in a branch predictor comprising a branch target buffer, the first skip-over offset value defining a number of search addresses of the branch predictor to be skipped;

storing a redirect index of the branch target buffer in a stream-based branch prediction index accelerator, wherein the redirect index is stored with a second skip-over offset value and a target address representing an offset into a target line of the branch target buffer;

searching, by the processing circuit, the branch predictor for a branch prediction; and responsive to finding the branch prediction, re-indexing the searching of the branch predictor based on the first skip-over offset value associated with the branch prediction; and adjusting the searching based on a result of comparing the first skip-over offset value of the branch predictor with the second skip-over offset value of the stream-based branch prediction index accelerator.

8. The method of claim 7, further comprising:

detecting a surprise branch that was unpredicted by the branch predictor or a predicted branch; and adjusting a previous skip-over offset value of a previous branch prediction in the branch predictor based on the surprise branch or the predicted branch.

9. The method of claim 7, further comprising:

installing a new branch prediction in the branch predictor;

assigning a new skip-over offset value of the new branch prediction to an unknown offset state comprising a skip of zero; and updating the new skip-over offset value of the new branch prediction, the updating performed based on encountering a next branch.

10. The method of claim 7, further comprising:

tracking the first skip-over offset value in the branch target buffer for either or both of a sequential path and a taken target path.

11. The method of claim 7, wherein the branch predictor further comprises a multiple target table, and further comprising:

tracking a third skip-over offset value in the multiple target table.

12. The method of claim 11, wherein the third skip-over offset value is set to a lowest offset encountered along all target paths.

13. A computer program product comprising a computer readable storage medium having program instructions embodied therewith, the program instructions executable by a processing circuit to perform a plurality of operations comprising:

storing a first skip-over offset value in a branch predictor comprising a branch target buffer, the skip-over offset value defining a number of search addresses of the branch predictor to be skipped;

storing a redirect index of the branch target buffer in a stream-based branch prediction index accelerator, wherein the redirect index is stored with a second skip-over offset value and a target address representing an offset into a target line of the branch target buffer;

searching the branch predictor for a branch prediction;

responsive to finding the branch prediction, re-indexing the searching of the branch predictor based on the first skip-over offset value associated with the branch prediction; and adjusting the searching based on a result of comparing the first skip-over offset value of the branch predictor with the second skip-over offset value of the stream-based branch prediction index accelerator.

14. The computer program product of claim 13, wherein the program instructions executable by the processing circuit are further configured to perform operations comprising:

detecting a surprise branch that was unpredicted by the branch predictor or a predicted branch; and adjusting a previous skip-over offset value of a previous branch prediction in the branch predictor based on the surprise branch or the predicted branch.

15. The computer program product of claim 13, wherein the program instructions executable by the processing circuit are further configured to perform operations comprising:

installing a new branch prediction in the branch predictor;

assigning a new skip-over offset value of the new branch prediction to an unknown offset state comprising a skip of zero; and updating the new skip-over offset value of the new branch prediction, the updating performed based on encountering a next branch.

16. The computer program product of claim 13, wherein the program instructions executable by the processing circuit are further configured to perform operations comprising:

tracking the first skip-over offset value in the branch target buffer for either or both of a sequential path and a taken target path.

17. The computer program product of claim 13, wherein the branch predictor further comprises a multiple target table, and the program instructions executable by the processing circuit are further configured to perform operations comprising:
   tracking a third skip-over offset value in the multiple target table.

* * * * *